(12) United States Patent
Ferson

(10) Patent No.: US 11,897,498 B2
(45) Date of Patent: Feb. 13, 2024

(54) CONTROL METHOD FOR A VEHICLE, COMPUTER PROGRAM, NON-TRANSITORY COMPUTER READABLE MEDIUM, AND AUTOMATED DRIVING SYSTEM

(71) Applicant: TOYOTA MOTOR EUROPE, Brussels (BE)

(72) Inventor: Niels Ferson, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 693 days.

(21) Appl. No.: 16/969,245

(22) PCT Filed: Feb. 15, 2018

(86) PCT No.: PCT/EP2018/053825
§ 371 (c)(1),
(2) Date: Aug. 12, 2020

(87) PCT Pub. No.: WO2019/158204
PCT Pub. Date: Aug. 22, 2019

(65) Prior Publication Data
US 2021/0001878 A1    Jan. 7, 2021

(51) Int. Cl.
*B60W 60/00* (2020.01)
*G05D 1/00* (2006.01)
*B60W 10/18* (2012.01)
*B60W 40/105* (2012.01)
*B60W 10/06* (2006.01)
(Continued)

(52) U.S. Cl.
CPC .......... *B60W 60/001* (2020.02); *B60W 10/18* (2013.01); *B60W 40/105* (2013.01); *B60W 10/06* (2013.01); *B60W 10/10* (2013.01); *B60W 10/20* (2013.01); *B60W 2520/10* (2013.01);
(Continued)

(58) Field of Classification Search
None
See application file for complete search history.

(56) References Cited

U.S. PATENT DOCUMENTS 6,624,747 B1 * 9/2003 Friederich ................. B60T 7/22
340/436
7,006,917 B2 * 2/2006 Hijikata ................ B60W 50/16
340/436
(Continued)

FOREIGN PATENT DOCUMENTS

EP    1426230 A2 *  6/2004 ........... B60K 26/021
EP    1484212 A1    12/2004
(Continued)

*Primary Examiner* — Jonathan M Dager
(74) *Attorney, Agent, or Firm* — Dickinson Wright, PLLC

(57) ABSTRACT

A control method for a host vehicle (100), comprising
  a) acquiring a speed (Vx) of the host vehicle, a relative speed (Vr) and distance (Dr) between a preceding vehicle (200) and the host vehicle (100);
  b) calculating a perceived risk level (PRL) as a function of said speed Vx of the host vehicle, said relative speed Vr, said relative distance Dr, and at least one of variables Vx*Vr and $Vx^2$; and
  c) controlling at least one vehicle device (32, 34, 36, 38) of the host vehicle as a function of the perceived risk level (PRL).

A computer program, a non-transitory computer-readable medium, and an automated driving system for implementing the above method.

13 Claims, 5 Drawing Sheets

(51) Int. Cl.
*B60W 10/10* (2012.01)
*B60W 10/20* (2006.01)

(52) U.S. Cl.
CPC ............... *B60W 2554/802* (2020.02); *B60W 2554/804* (2020.02)

(56) References Cited

U.S. PATENT DOCUMENTS

| | | | | |
|---|---|---|---|---|
| 7,136,755 | B2* | 11/2006 | Yamamura | G08G 1/166 340/436 |
| 7,155,342 | B2* | 12/2006 | Kobayashi | B60K 31/0008 340/436 |
| 7,395,138 | B2* | 7/2008 | Kondoh | G05G 1/38 701/1 |
| 7,715,972 | B2* | 5/2010 | Kuge | F02D 11/105 701/301 |
| 7,729,859 | B2* | 6/2010 | Kimura | B60W 10/04 701/1 |
| 7,734,419 | B2* | 6/2010 | Kondoh | G06V 20/58 340/436 |
| 8,000,874 | B2* | 8/2011 | Tange | B60W 50/16 701/96 |
| 8,244,458 | B1* | 8/2012 | Blackburn | G08G 1/166 342/174 |
| 8,364,345 | B2* | 1/2013 | Oida | B60N 2/508 701/37 |
| 8,386,119 | B2* | 2/2013 | Kobayashi | B60G 17/0195 340/576 |
| 8,442,739 | B2* | 5/2013 | Kuge | B60W 10/184 340/901 |
| 8,447,489 | B2* | 5/2013 | Murata | B60W 30/025 180/169 |
| 8,489,318 | B2* | 7/2013 | Reinisch | B60T 8/17558 701/96 |
| 9,483,945 | B2* | 11/2016 | Okita | G08G 1/166 |
| 9,779,624 | B2* | 10/2017 | Lefevre | G08G 1/166 |
| 9,959,766 | B2* | 5/2018 | Ichihara | H04W 4/027 |
| 10,421,398 | B2* | 9/2019 | Igarashi | H04N 13/254 |
| 2004/0249549 | A1* | 12/2004 | Kondoh | B60W 40/02 701/96 |
| 2006/0106505 | A1* | 5/2006 | Kuge | B60W 40/09 701/1 |
| 2007/0030132 | A1* | 2/2007 | Kobayashi | B60W 50/16 340/436 |
| 2008/0074246 | A1* | 3/2008 | Isaji | B60W 30/18145 701/301 |
| 2008/0097699 | A1* | 4/2008 | Ono | B62D 15/0265 701/300 |
| 2009/0143951 | A1* | 6/2009 | Takahashi | B60W 30/09 701/70 |
| 2009/0192710 | A1* | 7/2009 | Eidehall | B60W 50/0097 701/300 |
| 2009/0265107 | A1* | 10/2009 | Matsuno | G08G 1/166 701/301 |
| 2013/0261915 | A1* | 10/2013 | Tokimasa | B60W 10/18 701/70 |
| 2014/0039786 | A1* | 2/2014 | Schleicher | B60W 10/04 701/301 |
| 2014/0324297 | A1* | 10/2014 | Kim | B60W 10/20 701/48 |
| 2015/0191176 | A1* | 7/2015 | Kobana | B60W 40/08 701/70 |
| 2015/0203126 | A1* | 7/2015 | Kobana | B60W 50/12 701/1 |
| 2015/0336579 | A1* | 11/2015 | Yoshizawa | B60T 7/22 701/70 |
| 2017/0057499 | A1* | 3/2017 | Kim | B60Q 9/008 |
| 2017/0186319 | A1* | 6/2017 | Tsushima | B60W 30/0956 |
| 2017/0327110 | A1* | 11/2017 | Inoue | B60W 10/20 |
| 2018/0061253 | A1* | 3/2018 | Hyun | B60W 30/12 |
| 2018/0075309 | A1* | 3/2018 | Sathyanarayana | G05D 1/0055 |
| 2018/0162389 | A1* | 6/2018 | Minemura | B60T 7/12 |
| 2018/0194354 | A1* | 7/2018 | Takeda | B60W 30/14 |
| 2018/0297591 | A1* | 10/2018 | Minemura | B60W 40/00 |
| 2018/0370529 | A1* | 12/2018 | Matsunaga | B60W 50/14 |
| 2019/0001973 | A1* | 1/2019 | Matsunaga | B60T 7/12 |
| 2019/0071075 | A1* | 3/2019 | Mimura | G06V 20/584 |
| 2019/0139406 | A1* | 5/2019 | Adachi | G08G 1/096725 |
| 2019/0143968 | A1* | 5/2019 | Song | G08G 1/166 701/301 |
| 2019/0210597 | A1* | 7/2019 | Mukai | G08G 1/16 |
| 2020/0342756 | A1* | 10/2020 | MacKenzie | G08G 1/16 |
| 2021/0362745 | A1* | 11/2021 | Ferson | B60W 30/143 |

FOREIGN PATENT DOCUMENTS

| | | |
|---|---|---|
| EP | 1873035 A2 | 1/2008 |
| EP | 3127737 A1 | 2/2017 |
| JP | 2005-112242 A | 4/2005 |
| JP | 2015-193329 A | 11/2015 |

\* cited by examiner

CONTROL METHOD FOR A VEHICLE, COMPUTER PROGRAM, NON-TRANSITORY COMPUTER READABLE MEDIUM, AND AUTOMATED DRIVING SYSTEM

RELATED APPLICATION

This application is a National Stage entry of PCT Application No. PCT/EP2018/053825, filed Feb. 15, 2018, including the specification, drawings and abstract, the entire disclosure of which is incorporated herein by reference.

FIELD OF THE DISCLOSURE

The present invention relates to a control method which can be used to control one or more vehicle devices of a host vehicle, a computer program, a non-transitory computer-readable medium, and an automated driving system.

An automated driving system is a motor vehicle driving automation system that is capable of performing part or all of the dynamic driving task (DDT) on a sustained basis.

An automated driving system can be mounted or is to be mounted in a car or a vehicle (such as a car, a truck, etc).

In the case of road vehicles, it may range in level from no driving automation (level 0) to full driving automation (level 5) according to SAE norm J3016.

In order to realize this function, an automated driving system normally comprises at least one sensor, and an electronic control unit which transmits controls to actuator(s) of the vehicle (for instance to the steering column or shaft, the brake, the accelerator pedal or the like) to take some driving load off the driver.

An automated driving system is at least capable of assuming part of the driving task (for instance, to perform longitudinal control of the vehicle). In particular, many automated driving systems are designed to assist the driver and are therefore called Advanced Driver Assistance Systems (ADAS). Some automated driving systems are capable of assuming the whole driving task, at least during some periods. Such systems are classified at level 3, 4 or 5 according to SAE norm J3016.

The present invention concerns an automated driving system classified at any level from 1 to 5 according to SAE norm J3016.

BACKGROUND OF THE DISCLOSURE

It is well known that many driving decisions are based on a 'perceived risk' perceived by the driver of a vehicle.

This 'perceived risk' aboard the host vehicle is a parameter which represents the risk perceived by a human driver who is driving the host vehicle. By extension, in case there is no driver in the vehicle, the 'perceived risk' is the risk that who would be perceived by a human driver driving the host vehicle at the time considered.

A 'driving decision' is any decision made by the driver and which leads to change the way the vehicle is controlled. For instance, typical driving decisions are decisions to brake, to accelerate, to turn left or right, and/or the combinations of these actions (when possible), and/or the increase/decrease of these actions.

When vehicles with partial or total automated driving (hereinafter, the 'automated vehicles') merge in the traffic, they have to merge with vehicles driven by humans. In order to maintain the highest safety level, a smooth integration of these vehicles requires in such circumstances that these automated vehicles behave in the traffic quite similarly to human-driven vehicles.

Consequently, it is necessary that the control systems of automated vehicles be capable of assessing the perceived risk perceived by human drivers when they are driving, so as to make driving decisions similarly to human beings.

It has been considered (see for instance document US 2007/0030132) that the perceived risk mainly depends on two parameters, the 'time headway' THW and the 'time to collision' TTC, defined as follows:

the time headway THW is the ratio between the host vehicle speed Vx and the relative distance dr between the host vehicle and the preceding vehicle:

$$THW = V_x/dr$$

the time to collision TTC is the ratio between the relative speed Vr between the host vehicle and the preceding vehicle and the relative distance dr between the host vehicle and the preceding vehicle:

$$TTC = V_r/dr.$$

It has been further considered that the perceived risk level (PRL), also called 'Risk perception' (RP), can be expressed in function of the time headway THW and the time to collision TTC by the following equation:

$$PRL = THW + \alpha TTC \quad (0)$$

where $\alpha$ is a constant.

In this model, a driver would start applying the brakes when the perceived risk level PRL would exceed a predetermined value MRL corresponding to a 'maximum risk level' accepted by the driver.

Consequently with this model, the driver would apply the brakes when $$PRL = THW + \alpha TTC = (V_x + \alpha V_r)/Dr = MRL$$

(MRL being predetermined).

Therefore, the risk perception used in the prior art leads to calculate the relative distance at braking with the following formula:

$$Dr = (V_x + \alpha V_r)/MRL.$$

According to the above formula, the relative distance Dr at brake start is a linear function of the host vehicle speed Vx and the relative speed Vr.

However, it appeared that such models do not correctly describe the actual behaviour of drivers.

Consequently, there is a need for a control method for an automated vehicle which would better represent the actual driving behaviour of the drivers.

More generally, no automated driving system and no control method for a vehicle has been identified so far which would correctly take into account (in particular, across several continents) the variety of perceived risk levels as really perceived by drivers.

Consequently, there is a need for an automated driving system and a control method for controlling various vehicle devices mounted in a vehicle during driving, which provides a correct estimate of the perceived risk level for the vehicle as perceived or as would be perceived by the driver, regardless of the country where the vehicle is driven. Based on such information, the controls issued by the automated driving system can be calculated so as to closely replicate human driving.

SUMMARY OF THE DISCLOSURE

According to the invention, in order to meet the above need, a control method for a host vehicle is disclosed.

Said control method comprises the steps of:
a) acquiring a speed Vx of the host vehicle, a relative speed Vr between a preceding vehicle and the host vehicle, and a relative distance Dr between the preceding vehicle and the host vehicle;
b) calculating a perceived risk level as a function of said speed Vx of the host vehicle, said relative speed Vr, said relative distance Dr, and at least one of parameters Vx*Vr and $Vx^2$;
c) controlling at least one vehicle device of the host vehicle as a function of the perceived risk level.

In the present document, the sign '*' between two vector names indicates the scalar product of the two vectors. $Vx^2$ means the product Vx*Vx.

In the above definition, the 'perceived risk level' calculated at step a) is a parameter which represents the risk perceived by a human driver who is driving or who would be driving the host vehicle.

The perceived risk level calculated at step b) varies as a function of at least one of parameters Vx*Vr and $Vx^2$.

The inventors have indeed found, based on different studies, that the relative distance Dr at braking can vary in quadratic relationship of the host vehicle speed Vx and/or to the product (Vx*Vr) of the host vehicle speed Vx and the relative speed Vr. Consequently, it is preferable to calculate the perceived risk level as a function of at least one of parameters Vx*Vr and $Vx^2$.

Calculating the perceived risk level in such a manner provides more accurate values, in particular at high speeds, than in prior methods, in which the perceived risk level PRL was only defined by a linear combination of the parameters Vx/Dr and Vr/Dr (see for instance above-mentioned equation (0)).

Advantageously, the perceived risk level calculated at step b) in accordance with the present disclosure provides relevant values over a broad range of speeds, for instance from 10 km/h to 100 or even 120 km/h. This makes it possible to use the present method to control a vehicle over said broad range of speeds.

On the other hand, preferably the perceived risk level is not calculated as a function of the square relative speed ($Vr^2$). It has appeared indeed that there is no quadratic dependency of the relative distance at braking with respect to the relative speed Vr between the host vehicle and the preceding vehicle.

In an embodiment, in step b), the perceived risk level (PRL) is calculated based on equation (1):

$$PRL = (Dr - Pb*V)/(Pa*V); \text{ in which} \quad (1)$$

Pa, Pb are five components vectors; and
V is vector (1; Vx; Vr; Vx*Vr; $Vx^2$).

It has further been found that the components of vectors Pa and Pb preferably satisfy the following relations:
Pa=(Pa1,Pa2,Pa3,Pa4,Pa5)
Pb=(Pb1,Pb2,Pb3,Pb4,Pb5)
Pa1/Pa2=0.295±0.15
Pa2/Pa3=−0.236±0.12
Pa3/Pa4=−8.2±4.1
Pa4/Pa5=5.72±2.75
Pb1/Pb2=1.8±0.9
Pb2/Pb3=−3.98±2
Pb3/Pb4=−32.6±16.3
Pb4/Pb5=1.77±0.89
in which Pa1, . . . Pa5 and Pb1, . . . Pb5 are real numbers.

Of course, the above expressions define ranges. For instance, the equation "Pa1/Pa2=0.295±0.15" means that Pa1/Pa2 takes up any value at least equal to 0.145 and at most equal to 0.445.

Even more preferably, the components of vectors Pa and Pb satisfy the following relations:
Pa1/Pa2=0.295±0.07
Pa2/Pa3=−0.236±0.06
Pa3/Pa4=−8.2±2.05
Pa4/Pa5=5.72±1.4
Pb1/Pb2=1.8±0.45
Pb2/Pb3=−3.98±1
Pb3/Pb4=−32.6±8.15
Pb4/Pb5=1.77±0.45

For instance, it has been found based on behavioural studies that the following values are particularly appropriate for vectors Pa and Pb:
Pa=(−0.00094±0.00047; −0.0032±0.0016; 0.014±0.007; −0.0017±0.00085; −0.00029±0.00015); and
Pb=(−4.5±2.25; −2.5±1.25; 0.62±0.31; −0.019±0.009; −0.011±0.0055).

Indeed formula (1), in particular with the values of the components of Pa and Pb mentioned above, provides values of the perceived risk level which appear to represent quite accurately the driving behaviours of a broad variety of drivers.

Once calculated, the perceived risk level can be used to control the vehicle in a broad variety of manners.

In an embodiment, the perceived risk level parameter PRL is used to define the driving style of the vehicle. This driving style can be predefined for the vehicle, or can be chosen by the user of the vehicle. In this latter case, the user is requested to input to the automated driving system a Maximum Risk Level (MRL) he or she considers as acceptable.

Accordingly, in an embodiment of the above-defined control method, in step c) controlling said at least one vehicle device includes controlling said at least one vehicle device as a function of a difference between the perceived risk level (PRL) and a maximum acceptable risk level (MRL). The maximum acceptable risk level (MRL) is a predetermined value, which can be constant, or can be inputted into the vehicle control system by a user of the host vehicle.

In an embodiment, said at least one vehicle device includes at least one driving actuator.

In this case, in step c), controlling said at least one vehicle device may include actuating said at least one driving actuator when the perceived risk level PRL exceeds a predetermined value (MRL).

In an embodiment, said at least one vehicle device includes at least one brake. In this case, the perceived risk level (PRL) calculated at step b) can be used for instance for triggering braking at step c).

In a particular implementation, the controlling step of the control method for a host vehicle is determined by computer program instructions.

Accordingly, the invention also provides a computer program which is stored on a non-transitory computer-readable medium, and which is suitable for being executed by a processor, the program including instructions adapted to perform the control method described above when it is executed by the processor.

The computer program may use any programming language, and be in the form of source code, object code, or code intermediate between source code and object code, such as in a partially compiled form, or in any other desirable form.

The invention also provides a non-transitory computer-readable medium storing instructions that, when executed by a processor, cause the processor to perform the control method mentioned above.

The computer-readable medium may be an entity or device capable of storing the program. For example, the computer-readable medium may comprise storage means, such as a read only memory (ROM), e.g. a compact disk (CD) ROM, or a microelectronic circuit ROM, or indeed magnetic recording means, e.g. a floppy disk or a hard disk.

Alternatively, the computer-readable medium may be an integrated circuit in which the program is incorporated, the circuit being adapted to execute or to be used in the execution of the control method in question.

Another object of the present invention is to provide an automated driving system for a host vehicle, comprising an electronic control unit configured a) to acquire a speed Vx of the host vehicle, a relative speed Vr between a preceding vehicle (200) and the host vehicle (100), and a relative distance Dr between the preceding vehicle and the host vehicle;
b) to calculate a perceived risk level as a function of said speed Vx of the host vehicle, said relative speed Vr, said relative distance Dr, and at least one of parameters Vx*Vr and $Vx^2$;
c) to control at least one vehicle device of the host vehicle as a function of the perceived risk level.

In an embodiment of this automated driving system, the control unit (20) is configured to calculate the perceived risk level based on equation (1):

$$PRL=(Dr-Pb*V)/(Pa*V); \text{ wherein} \quad (1)$$

Pa, Pb are five components vectors; and V=(1; Vx; Vr; Vx*Vr; $Vx^2$).

In a preferred embodiment, the components of vectors Pa and Pb satisfy the following relations:
Pa=(Pa1,Pa2,Pa3,Pa4,Pa5)
Pb=(Pb1,Pb2,Pb3,Pb4,Pb5)
Pa1/Pa2=0.295±0.15
Pa2/Pa3=−0.236±0.12
Pa3/Pa4=−8.2±4.1
Pa4/Pa5=5.72±2.75
Pb1/Pb2=1.8±0.9
Pb2/Pb3=−3.98±2
Pb3/Pb4=−32.6±16.3
Pb4/Pb5=1.77±0.89
in which Pa1, . . . Pa5 and Pb1, . . . Pb5 are real numbers.

For instance, in an embodiment, vectors Pa and Pb may take up the values:
Pa=(−0.00094±0.00047; −0.0032±0.0016; 0.014±0.007; −0.0017±0.00085; −0.00029±0.00015); and
Pb=(−4.5±2.25; −2.5±1.25; 0.62±0.31; −0.019±0.009; −0.011±0.0055).

In an embodiment, the electronic control unit is configured, for controlling said at least one vehicle device, to control said at least one vehicle device as a function of a difference between the perceived risk level and a predetermined maximum acceptable risk level.

In an embodiment, the electronic control unit is configured to actuate at least one driving actuator among said at least one vehicle device when the perceived risk level PRL exceeds a predetermined value.

In an embodiment, said at least one vehicle device includes at least one brake and/or at least one other driving actuator.

BRIEF DESCRIPTION OF THE DRAWINGS

The present invention may be better understood and its advantages will become apparent to those skilled in the art by reference to the accompanying figures in which.

DESCRIPTION OF THE EMBODIMENTS

An automated driving system 10 in which the above-mentioned method for controlling the vehicle is implemented is now going to be described.

Figure 1:
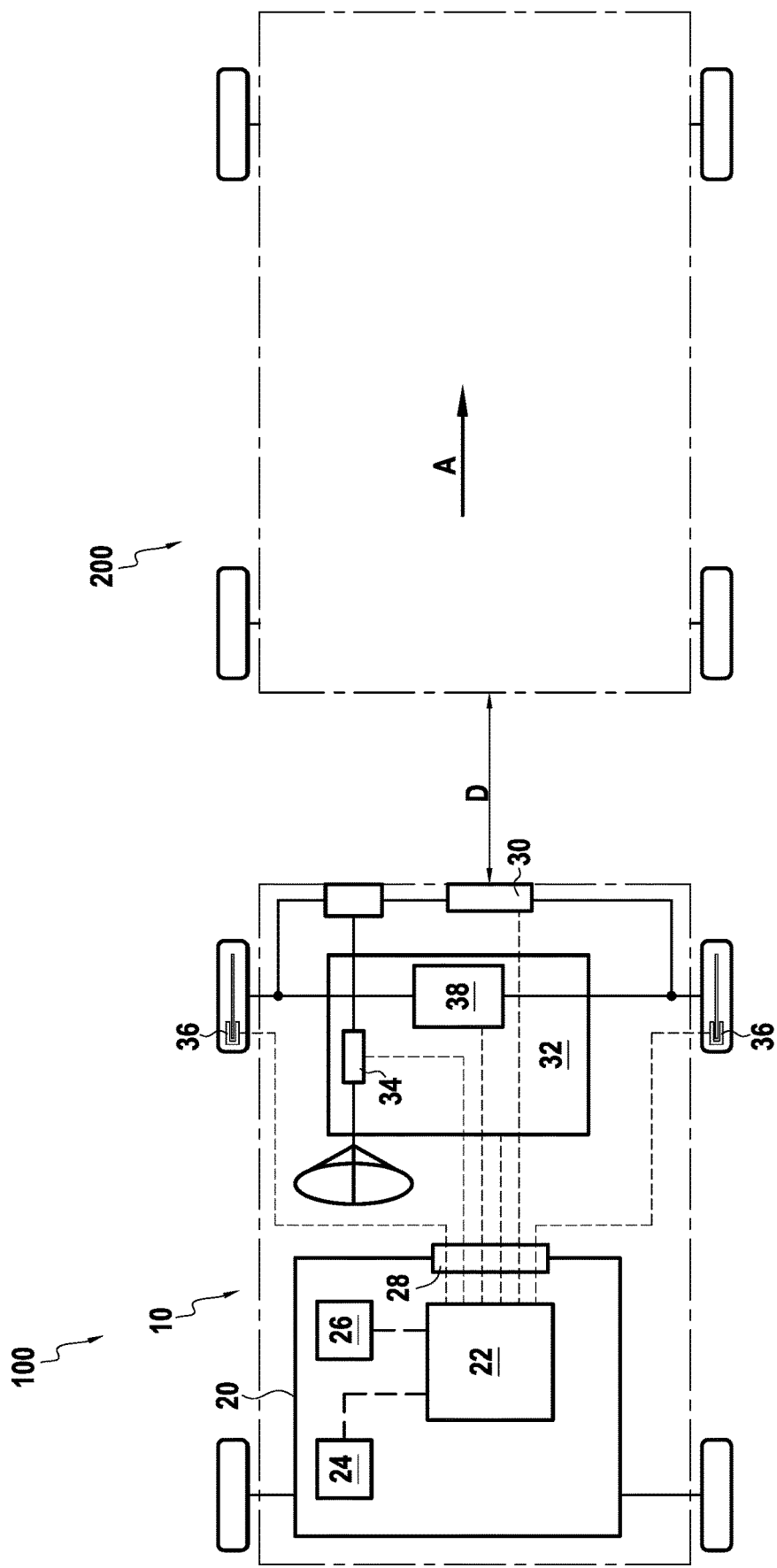
FIG. 1 is a schematic drawing of a vehicle equipped with an automated driving system according to the present disclosure, represented behind a preceding vehicle.

FIG. 1 schematically represents a car 100 (an example of a host vehicle) equipped with the automated driving system 10 which forms an exemplary embodiment of the present disclosure. Car 100 follows a 'preceding vehicle' 200. Both vehicles move in the direction shown by arrow A. The host vehicle and the preceding vehicle are separated by a relative distance Dr (Distance Dr appears proportionally much shorter on FIG. 1 than what it is in reality).

The automated driving system 10 (or, in short, the system 10) is, in the present case, an automated driving system comprising an electronic control unit 20 and several sensor units collectively referenced 30, comprising several cameras, a lidar unit, a set of radars, a close range sonar sensor unit, a GPS unit, a radio communication system for communicating with the infrastructure and/or with other vehicles, and a speed sensor measuring the speed Vx of the vehicle.

The radars of the set of radars in particular measure the relative speed Vr between the preceding vehicle 200 and the host vehicle 100.

All the above-mentioned sensor units 30 are connected to the electronic control unit 20 (ECU 20).

The ECU 20 has globally the hardware architecture of a computer. The ECU 20 comprises a microprocessor 22, a random access memory (RAM) 24, a read only memory (ROM) 26, an interface 28.

The hardware elements of ECU 20 are optionally shared with other units of the automated driving system 10 and/or other systems of the car 100.

The interface 28 includes in particular a tactile display and various displays mounted in or on the dashboard of the car.

The interface 28 therefore comprises a driver interface with a (not-shown) display to transmit information to the driver of the car 100, and interface connections with actuators and other vehicle devices of the car. In particular, interface 28 comprises a connection with several driving actuators of the car. These driving actuators include the engine 32, the steering column 34, the brakes 36, and the transmission 38.

The ECU 20 transmits torque requests to the engine ECU, and engagement controls to the respective engagement elements (e.g. clutches) of the transmission 38. Based on these controls, the engine ECU controls the torque delivered by the engine 32 and the transmission adopts the desired configuration, whereby the desired acceleration is imparted to the car.

A computer program configured to partly assume the driving task by performing lateral and longitudinal control of the vehicle is stored in memory 26. This program is configured to calculate the controls which, at least during some driving periods, control the driving actuators of the host vehicle.

This program, and the memory 26, are examples respectively of a computer program and a non-transitory computer-readable medium pursuant to the invention.

The read-only memory 26 of the ECU 20 indeed constitutes a non-transitory computer readable medium according to the invention, readable by the processor 22. It stores instructions which, when executed by a processor, cause the processor 22 to perform the control method according to the present invention.

More specifically, the program stored in memory 26 includes instructions for executing a method for controlling the driving actuators 32, 34, 36 and 38 as a function of the perceived risk level PRL.

The automated driving system 10 is designed to handle the driving tasks only under the constant supervision of the driver. System 10 is thus considered as an automated driving system of level 2 pursuant to SAE norm J3016. The present disclosure however can be implemented on automated driving systems of any level from 1 to 5.

To perform its function, system 10 uses data provided by sensors 30, processes the data in ECU 20, and controls the driving actuators of the car on the basis of controls calculated by ECU 20. In addition, information exchange between the vehicle 100 and external devices via interface 28 may also possibly take place to improve the performance of system 10.

As mentioned above, the ECU issues controls to control the actuators of car 100; these controls are calculated as a function of a perceived risk level PRL.

Figure 2:
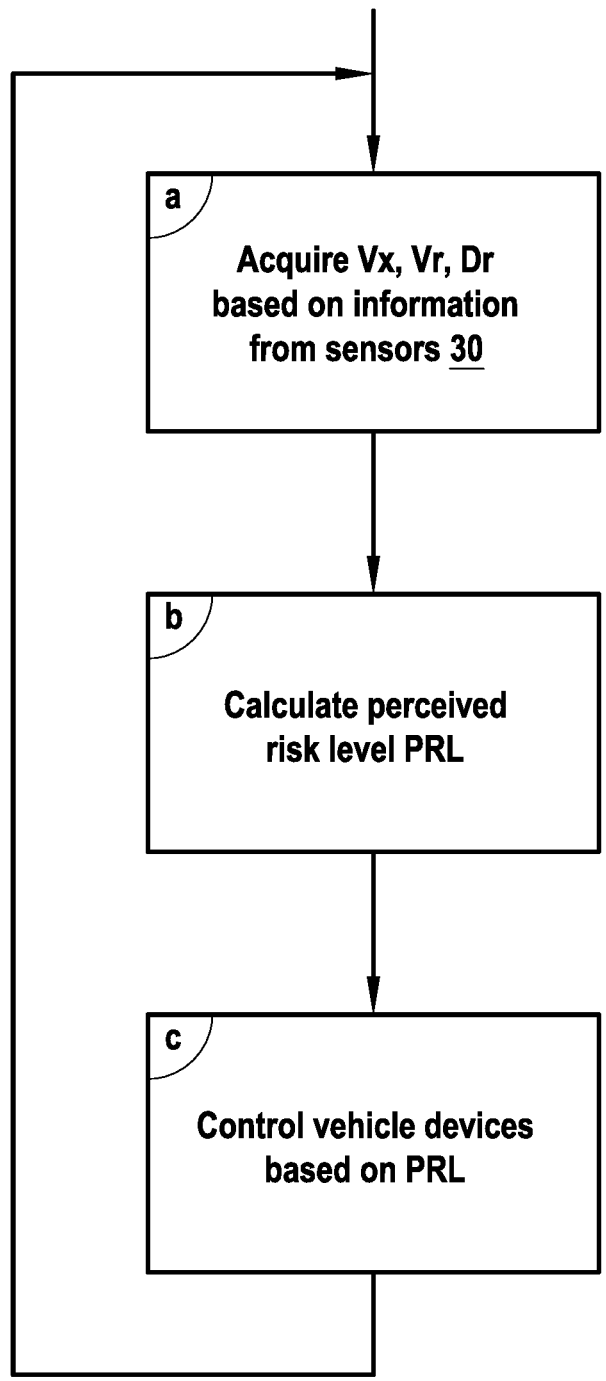
FIG. 2 is a flowchart illustrating a vehicle control method according to the present disclosure.

In accordance with the present disclosure, the vehicle 100 can controlled during driving for instance pursuant to the control method illustrated by FIG. 2.

In this method, in a first step a), the relative speed Vr and the relative distance Dr between the host vehicle 100 and a preceding vehicle 200 are acquired by ECU 20, based on radar information provided by the radars of sensors 30.

The host vehicle speed Vx is acquired from the speed sensor of sensors 30.

Then, at step b), the perceived risk level PRL is calculated.

The perceived risk PRL can only be calculated in a situation where the host vehicle 100 is following a preceding vehicle 200, as illustrated on FIG. 1.

The perceived risk level PRL is calculated based on the speed of the host vehicle Vx, the relative speed between the host vehicle and the preceding vehicle Vr and the relative distance between the host vehicle and the preceding vehicle Dr using equation (1):

$$PRL = (Dr - Pb*V)/(Pa*V); \text{ wherein} \quad (1)$$

$Pa = (-0.00094; -0.0032; 0.014; -0.0017; -0.00029);$
$Pb = (-4.5; -2.5; 0.62; -0.019; -0.011);$ and
$V = (1; Vx; Vr; Vx*Vr; Vx^2).$ In this exemplary embodiment of a control method pursuant to the present disclosure, for each component of each of vectors Pa and Pb, the central or mean value of the available range of values for each component is used. However, it is possible to use other values of these parameters.

For instance, for the first component of the vector Pa, any value equal to $-0.00094 \pm 0.0047$ can be used. The same rationale applies to the other components of vector Pa, and to the components of vector Pb.

Then, in a third step c), one or more driving actuators of the host vehicle 100 are controlled as a function of the perceived risk level PRL. For instance, the brakes 36 can be applied; the timing (or the distance Dr) at which braking is triggered is determined based on the perceived risk level PRL. Usually, the driving system 10 is configured to modify the braking force, the acceleration or torque of the engine, and/or the steering angle of the vehicle based on the perceived risk level.

The algorithm is carried out iteratively at regular time steps. After controls have been issued for the various driving actuators at step c), the algorithm is resumed at step a).

Another and more specific exemplary control method of a vehicle in accordance with the present disclosure will now be described in relation with FIG. 3.

In this embodiment, the driver of vehicle 100 has the possibility to specify the maximum accepted risk level ('MRL') which is the maximum risk to which he or she wants to be exposed while the automated driving system 10 drives the car.

Based on this parameter, in vehicle 100, the controls sent to the driving actuators 32, 34, 36 and 38 take into account the difference between the calculated perceived risk level PRL, and the desired perceived risk level MRL specified by the driver.

By this setting, the driver can request the driving system to adopt a more or less aggressive driving style.

The control of vehicle 100 is realized by ECU 20 which executes an algorithm substantially identical to the algorithm of FIG. 2.

The first steps a) and b) of this algorithm are identical to steps a) and b) of the preceding method.

However, in this embodiment, step c) of controlling the driving actuators is carried out as follows in two steps c1) and c2).

Beforehand, in a step c0), the user of the vehicle is requested to input the maximum risk level MRL he or she is willing to accept during the trip, and which he or she considers acceptable.

During the trip, each time a preceding vehicle is detected in front of the host vehicle in the same lane as the host vehicle, the perceived risk level PRL is calculated at step b).

Then at a step c1), the perceived risk level PRL is compared to the maximum risk level MRL previously inputted by the user of the vehicle. That is, the difference between PRL and MRL (PRL−MRL) is calculated.

If this difference is negative, that is, if the perceived risk level PRL does not exceed the maximum risk level MRL, no further action is taken and the algorithm jumps to step a), which is carried out at the next time step.

Conversely, if this difference is positive, that is, the perceived risk PRL exceeds the maximum risk level MRL, then the algorithm jumps to step c2). In step c2), the control unit 20 controls the brakes 36 to be applied. That is, in this latter case a control value is outputted by the control unit 20 and, based on this value, the brakes 36 are applied.

Figure 3:
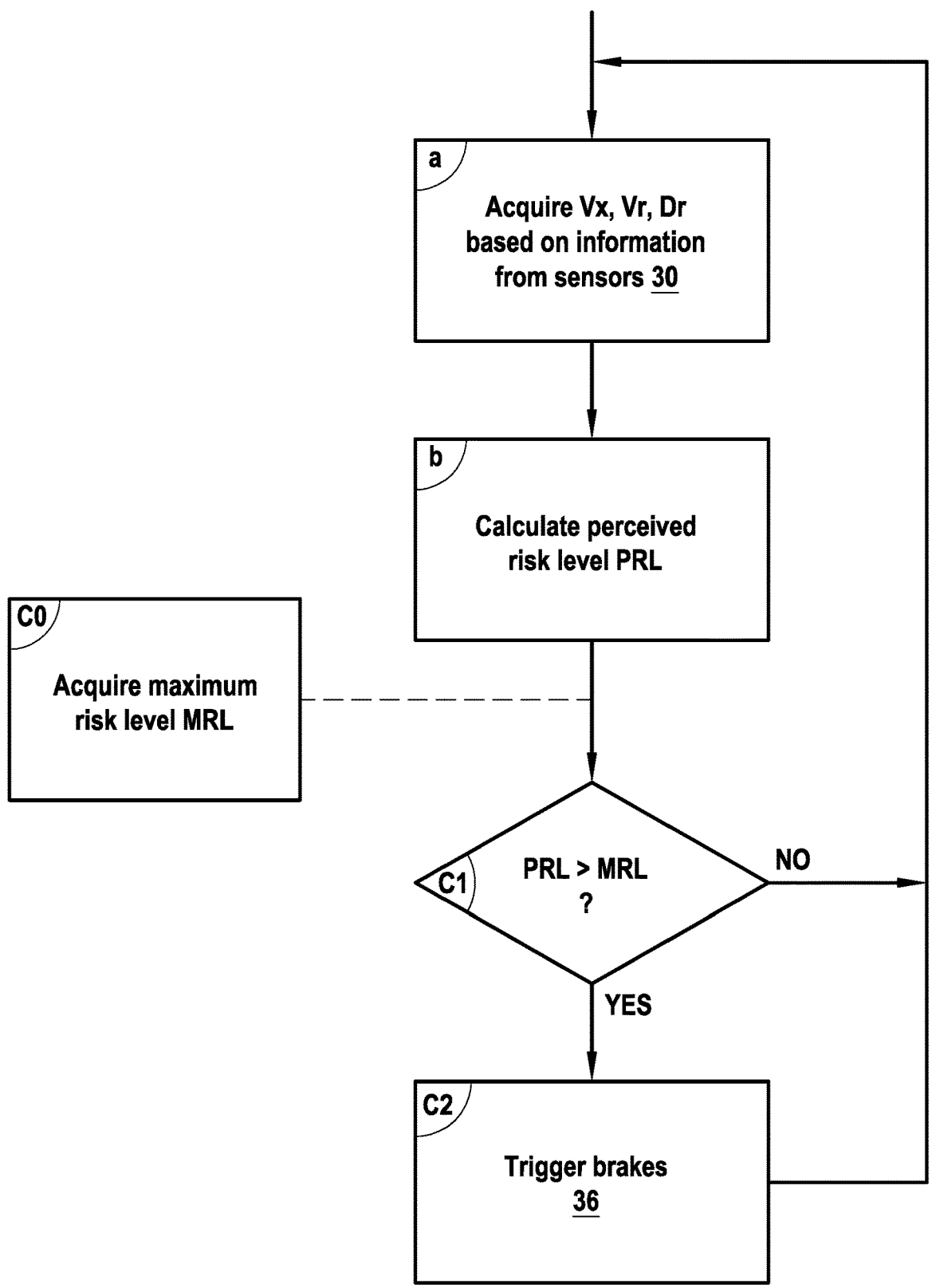
FIG. 3 is a flowchart illustrating a vehicle control method according to the present disclosure, in the specific case of braking control.

The control method illustrated by FIGS. 2 and 3 are only exemplary embodiments of the present disclosure.

More generally, as mentioned before, many different functions or systems of a car or a road vehicle can be controlled based on the perceived risk level. Usually, the driving system of the vehicle is configured to modify the braking force, the acceleration or torque of the engine, and/or the steering angle of the vehicle based on the perceived risk level. The driving system of the vehicle however may also trigger warning signals (visual, audible, haptic) based on the perceived risk level. Accordingly, the devices used to emit said visual, audible and/or haptic signal are other examples of vehicle devices which can be controlled based on the PRL parameter, in accordance with the present disclosure.

Although the present invention has been presented above with a PRL function based on equation (1), and with specific values of Pa and Pb, the invention is by no means limited to this specific value of the PRL function, the equation (1), and/or these specific values of Pa and Pb. The invention can be implemented with many different PRL functions.

In the development of a control system for a vehicle, if using a specific PRL function is considered, it is possible to check whether this function provides an effective value of the PRL parameter by using the following verification method (FIGS. 4 to 7).

a) Database Establishment

First, a database of exemplary brakings by drivers in representative driving situations is constituted.

This database contains records of brake applications having taken place during driving. For each brake application, the record of the database includes at least the following information: the vehicle speed Vx, the relative speed Vr and the relative distance Dr between the host vehicle and the preceding vehicle at the time the brakes were applied.

Figure 4:
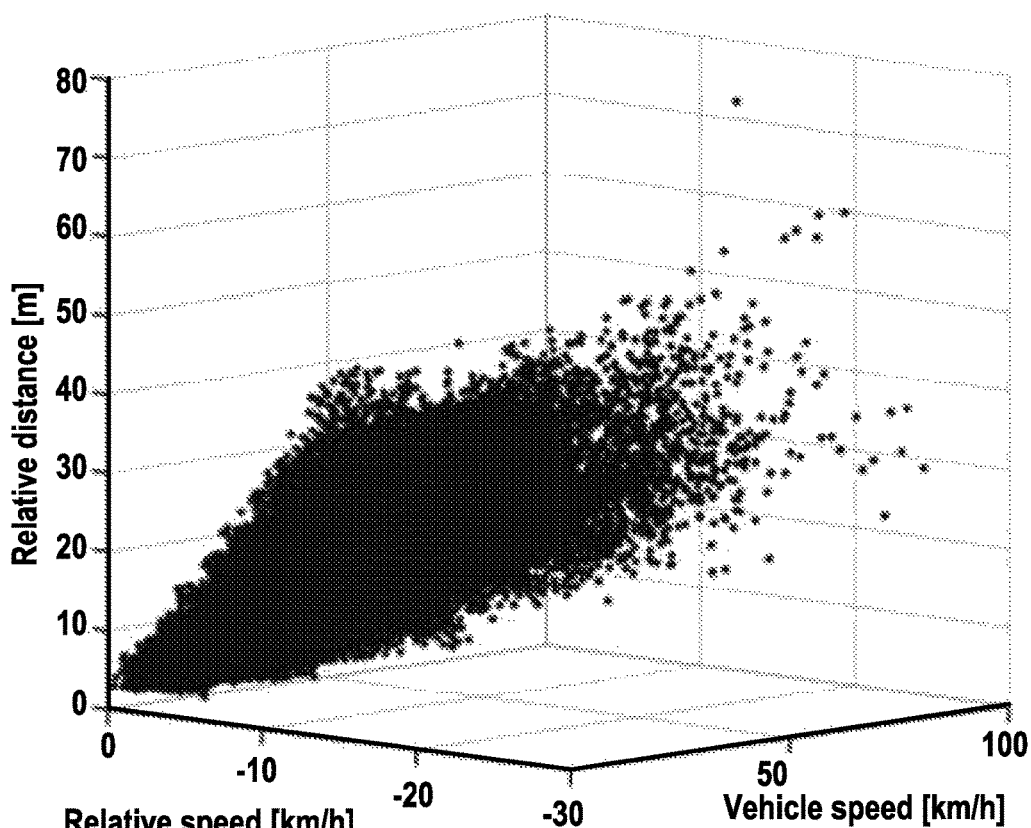
FIG. 4 is a drawing illustrating a database of braking records.
Figure 5:
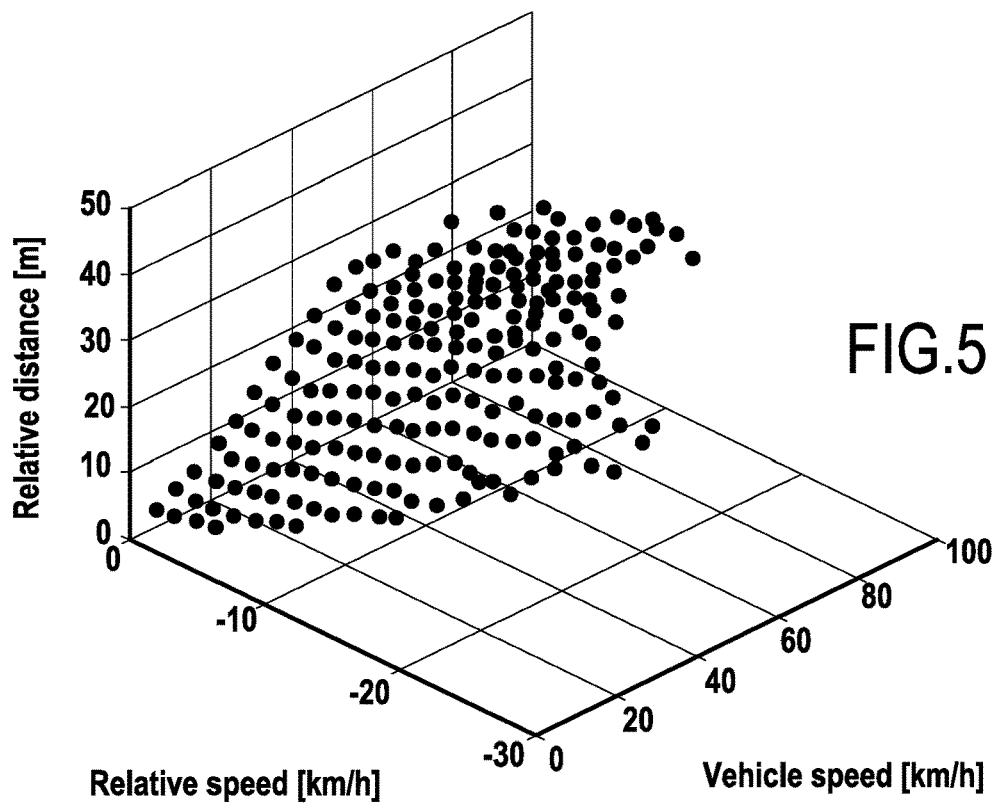
FIG. 5 is a drawing illustrating the database of braking records, wherein groups have been formed based on relative speed and vehicle speed, and each group is represented by a point.

The database of braking records is represented on FIGS. 4 and 5. Each point of FIG. 4 represents a braking event which has been recorded for a vehicle. All these braking events are plotted in an axis system comprising the Vehicle speed Vx, the relative speed between the vehicle and the preceding vehicle, Vr, and the relative distance between the two vehicles, Dr.

b) Establishment of Data Groups

The braking records are then grouped based on relative speed Vr and vehicle speed Vx. For instance, the total range of speeds of the relative speeds is divided into ten ranges Vri (i=1 ... 10); similarly, the total range of speeds of the vehicle speeds is divided into ten ranges Vxj (j=1 ... 10).

The groups (Vri,Vxj) obtained in this manner are shown on FIG. 5. Each point is represented by a dot showing the mean relative distance for the group.

Then, in each group (Vri,Vxj) the braking records are grouped again in deciles based on relative distance Dr when braking is triggered, thus forming 'per-decile-groups' (Vri, Vxi,k).

Deciles 'k' can be for instance referenced by a parameter k, with k=0 to 9, corresponding respectively to groups 0-10%, 10-20%, ..., 90-100%.

(Of course, any granularity can be chosen for the assessment. Centiles could be chosen rather than deciles, for instance).

These deciles correspond respectively to the brakings of ten groups of drivers (the ten 'deciles') ranging from the less risk-adverse drivers (small relative distances Dr at braking) to the most risk-adverse drivers (high relative distances Dr at braking).

c) Plotting PRL as a Function of Vx and Vr

Figure 6:
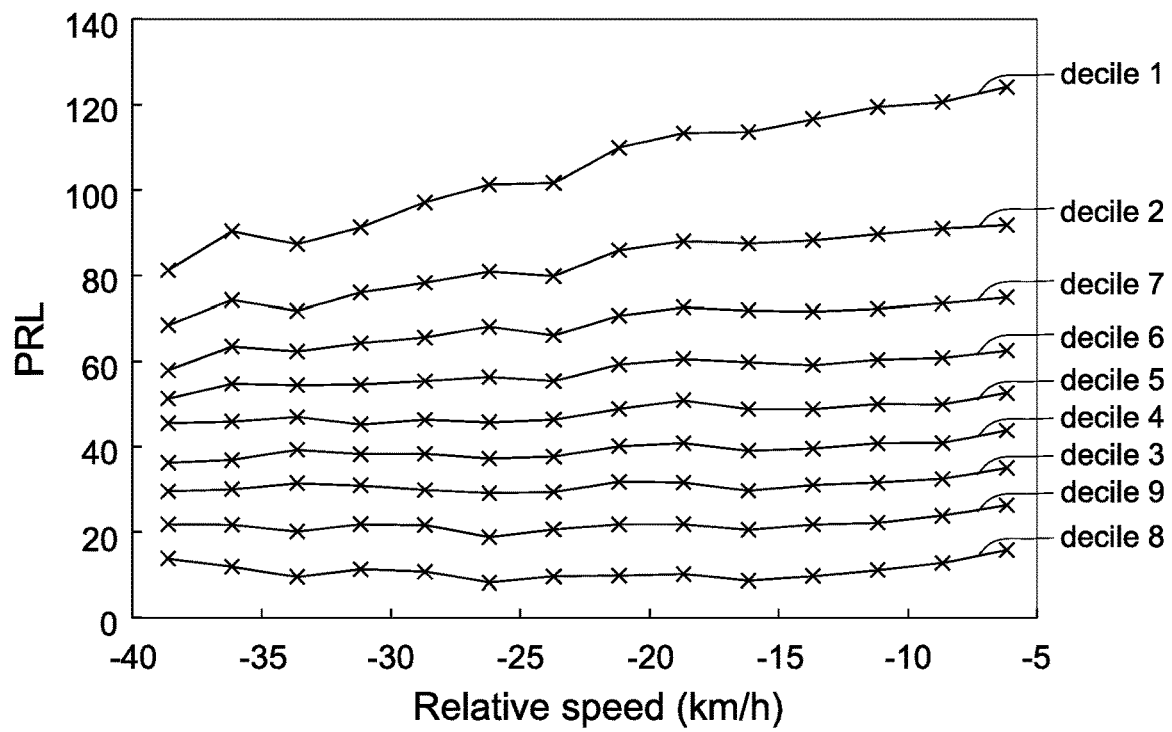
FIG. 6 is a plot showing the variations of the perceived risk level as a function of the speed of a host vehicle, for various groups of drivers.
Figure 7:
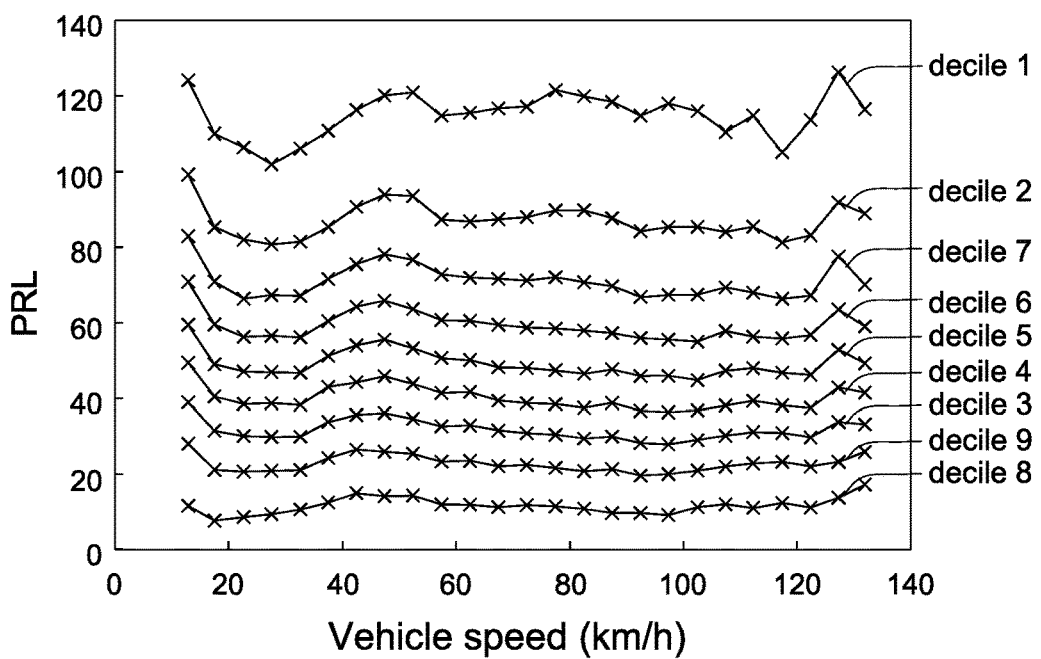
FIG. 7 is a plot showing the variations of the perceived risk level as a function of the relative speed of a preceding vehicle with respect to the host vehicle, for the same groups of drivers.

Then, the curves representing PRL as a function respectively of the speed of the host vehicle Vx and the relative speed Vr are drawn (FIGS. 6 and 7). As an example, such curves have been drawn based on the exemplary PRL functions and the values of Pa and Pb proposed above.

In FIGS. 6 and 7, the abscissa represents respectively Vx and Vr, and the ordinate represents PRL. Each of these figures shows nine curves corresponding to the nine deciles having the lowest relative distance at braking (conversely, the decile (k=0) representing the most prudent drivers is not represented).

Based on FIGS. 6 and 7, it can be noted that for any given decile, the value of PRL is substantially constant, regardless of the value of the abscissa.

Since the exemplary PRL functions proposed above exhibit this feature, it can be concluded that these PRL function provide a satisfactory evaluation of the perceived risk level PRL for drivers having a similar driving behaviour as the drivers represented by the braking database.

The invention claimed is:

1. A control method for a host vehicle, the method comprising the steps of:
    a) acquiring a speed Vx of the host vehicle, a relative speed Vr between a preceding vehicle and the host vehicle, and a relative distance Dr between the preceding vehicle and the host vehicle;
    b) calculating a perceived risk level PRL as a function of said speed Vx of the host vehicle, said relative speed Vr, said relative distance Dr, and at least one of variables $Vx*Vr$ and $Vx^2$;
    c) controlling at least one vehicle device of the host vehicle as a function of the perceived risk level;
    wherein in step b), the perceived risk level PRL is calculated based on equation (1):

$$PRL=(Dr-Pb*V)/(Pa*V); \text{ wherein} \quad (1)$$

Pa, Pb are five components vectors; and
    $V=(1; Vx; Vr; Vx*Vr; Vx^2)$.

2. The control method according to claim 1, wherein Pa and Pb are linked by the following relations:
    Pa=(Pa1,Pa2,Pa3,Pa4,Pa5)
    Pb=(Pb1,Pb2,Pb3,Pb4,Pb5)
    Pa1/Pa2=0.295±0.15
    Pa2/Pa3=−0.236±0.12
    Pa3/Pa4=−8.2±4.1
    Pa4/Pa5=5.72±2.75
    Pb1/Pb2=1.8±0.9
    Pb2/Pb3=−3.98±2
    Pb3/Pb4=−32.6±16.3
    Pb4/Pb5=1.77±0.89
    in which Pa1, ... Pa5 and Pb1, ... Pb5 are real numbers.

3. The control method according to claim 1, wherein:
    Pa=(−0.00094±0.00047; −0.0032±0.0016; 0.014±0.007; −0.0017±0.00085; −0.00029±0.00015); and
    Pb=(−4.5±2.25; −2.5±1.25; 0.62±0.31; −0.019±0.009; −0.011±0.0055).

4. The control method according to claim 1, wherein in step c), controlling said at least one vehicle device includes controlling said at least one vehicle device as a function of a difference between the perceived risk level and a predetermined maximum acceptable risk level.

5. The control method according to claim 1, wherein step c) includes actuating at least one driving actuator among said at least one vehicle device when the perceived risk level PRL exceeds a predetermined value.

6. The control method according to claim 1, wherein said at least one vehicle device includes at least one brake and/or at least one other driving actuator.

7. A non-transitory computer-readable medium storing instructions that, when executed by a processor, cause the processor to perform the control method of claim 1.

8. An automated driving system for a host vehicle, the automated driving system comprising an electronic control unit configured
   a) to acquire a speed Vx of the host vehicle, a relative speed Vr between a preceding vehicle and the host vehicle, and a relative distance Dr between the preceding vehicle and the host vehicle;
   b) to calculate a perceived risk level as a function of said speed Vx of the host vehicle, said relative speed Vr, said relative distance Dr, and at least one of parameters $Vx*Vr$ and $Vx^2$;
   c) to control at least one vehicle device of the host vehicle as a function of the perceived risk level;
   wherein the control unit is configured to calculate the perceived risk level PRL based on equation (1):

$$PRL = (Dr - Pb*V)/(Pa*V); \text{ wherein} \quad (1)$$

Pa, Pb are five components vectors; and
$V = (1; Vx; Vr; Vx*Vr; Vx^2)$.

9. The automated driving system according to claim 8, wherein Pa and Pb are linked by the following relations:
Pa=(Pa1,Pa2,Pa3,Pa4,Pa5)
Pb=(Pb1,Pb2,Pb3,Pb4,Pb5)
Pa1/Pa2=0.295±0.15
Pa2/Pa3=−0.236±0.12
Pa3/Pa4=−8.2±4.1
Pa4/Pa5=5.72±2.75
Pb1/Pb2=1.8±0.9
Pb2/Pb3=−3.98±2
Pb3/Pb4=−32.6±16.3
Pb4/Pb5=1.77±0.89
in which Pa1, . . . Pa5 and Pb1, . . . Pb5 are real numbers.

10. The automated driving system according to claim 8, wherein
Pa=(−0.00094±0.00047; −0.0032±0.0016; 0.014±0.007; −0.0017±0.00085; −0.00029±0.00015); and
Pb=(−4.5±2.25; −2.5±1.25; 0.62±0.31; −0.019±0.009; −0.011±0.0055).

11. The automated driving system according to claim 8, wherein the electronic control unit is configured, for controlling said at least one vehicle device, to control said at least one vehicle device as a function of a difference between the perceived risk level and a predetermined maximum acceptable risk level.

12. The automated driving system according to claim 8, wherein the electronic control unit is configured to actuate at least one driving actuator among said at least one vehicle device when the perceived risk level PRL exceeds a predetermined value.

13. The automated driving system according to claim 8, wherein said at least one vehicle device includes at least one brake and/or at least one other driving actuator.

* * * * *